United States Patent
Scott et al.

(10) Patent No.: US 10,095,529 B2
(45) Date of Patent: Oct. 9, 2018

(54) FONT DOWNLOAD ON APPLICATION BOOT

(71) Applicant: Microsoft Technology Licensing, LLC, Redmond, WA (US)

(72) Inventors: Cameron A. Scott, Seattle, WA (US); Stephen Christopher Lozada Chua, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/175,288

(22) Filed: Jun. 7, 2016

(65) Prior Publication Data

US 2017/0351533 A1    Dec. 7, 2017

(51) Int. Cl.
*G06F 9/445*    (2018.01)
*G06F 9/54*    (2006.01)

(52) U.S. Cl.
CPC .......... *G06F 9/44505* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 6,751,726 B1 | 6/2004 | Dresevic et al. | |
| 8,078,965 B2 | 12/2011 | Wang-Aryattanwanich et al. | |
| 8,555,162 B2 | 10/2013 | Bacus et al. | |
| 8,644,810 B1 | 2/2014 | Boyle et al. | |
| 8,856,647 B2 | 10/2014 | Howell et al. | |
| 2006/0170684 A1* | 8/2006 | Kobayashi | G06F 17/214 345/467 |
| 2007/0024626 A1 | 2/2007 | Kagle et al. | |
| 2008/0079730 A1 | 4/2008 | Zhang et al. | |
| 2011/0090229 A1* | 4/2011 | Bacus | G06F 17/214 345/467 |
| 2012/0185686 A1* | 7/2012 | Kren | G06F 11/1417 713/2 |
| 2013/0179145 A1* | 7/2013 | Patel | G06F 17/30867 704/3 |
| 2013/0326348 A1* | 12/2013 | Ip | G06F 17/214 715/269 |
| 2014/0280693 A1 | 9/2014 | Schwanitz et al. | |

(Continued)

FOREIGN PATENT DOCUMENTS

| | | |
|---|---|---|
| JP | 9146521 A | 6/1997 |
| KR | 20140040994 A | 4/2014 |

OTHER PUBLICATIONS

"Fonts and font facilities supplied with Ghostscript", Published on: Oct. 9, 2006, Available at: http://ghostscript.com/doc/current/Fonts.htm.

(Continued)

*Primary Examiner* — Syed Roni
(74) *Attorney, Agent, or Firm* — Christopher R. Christenson; Kelly, Holt & Christenson, PLLC (57) ABSTRACT

When an application is booted, a font that will be used with the application is identified and it is determined whether the identified font it locally available to the device. If not, a request to a remote font service is automatically generated, and the identified font is downloaded based upon the detected application boot. The device then finishes booting the application.

14 Claims, 10 Drawing Sheets

(56) References Cited

U.S. PATENT DOCUMENTS

2016/0019189 A1    1/2016  Tiberi
2016/0351200 A1*  12/2016  Sung ..................... G10L 17/22
2017/0004113 A1*  1/2017  Gore ................... G06F 3/0482
2017/0262413 A1*  9/2017  Song ................... G06F 17/214

OTHER PUBLICATIONS

"How to use Ghostscript", Published on: Feb. 24, 2001, Available at: http://web.mit.edu/ghostscript/www/Use.htm.
"How to Use Cloud Fonts?", Published on: May 22, 2013, Available at: http://www.kingsoftstore.com/support-for-android-office/3307-how-to-use-cloud-fonts.html.
"On-Demand Resources Essentials", Retrieved on: Apr. 15, 2016, https://developer.apple.com/library/prerelease/ios/documentation/FileManagement/Conceptual/On_Demand_Resources_Guide/.

* cited by examiner

FONT DOWNLOAD ON APPLICATION BOOT

BACKGROUND

Computer systems are currently in wide use. Many computer systems run applications that generate content that can be displayed to a user. For instance, some such applications include word processing applications, spreadsheet applications, slide presentation applications, among a wide variety of others.

The content that is displayed to a user is often authored in, or otherwise associated with, a particular font that is to be used in rendering it. The font represents a particular size, weight and style of a typeface that is used to render the content. There are a great many different fonts that can be used to render content. There are even many different fonts within each language, for rendering content.

There are also a wide variety of different types of computing devices that can run computing systems and applications. For instance, applications can be run on desktop computers, laptop computers, and a wide variety of mobile devices. Each of these devices may be used in a different location, and they may have different physical characteristics. For example, a mobile device may be used in Asia and may have a first quantity of memory. However, a similar device may be run in Europe, and have a different quantity of memory.

When a user downloads a computing system or application to his or her device, the computing system or application also, often, includes a font package which contains a relatively large number of fonts. It is not uncommon, for instance, for some computing systems to include a font package that ranges in size from 150-180 MB. In fact, some individual fonts (such as some Asian fonts) may range in size, themselves, from 30-40 MB. On devices with relatively limited memory, the font package can take up a relatively large percent of the available memory.

The discussion above is merely provided for general background information and is not intended to be used as an aid in determining the scope of the claimed subject matter.

SUMMARY

When an application is booted on a device, a font that will be used with the application is identified and it is determined whether the identified font it locally available to the device. If not, a request to a remote font service is automatically generated, and the identified font is downloaded based upon the detected application boot. The device asynchronously finishes booting the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
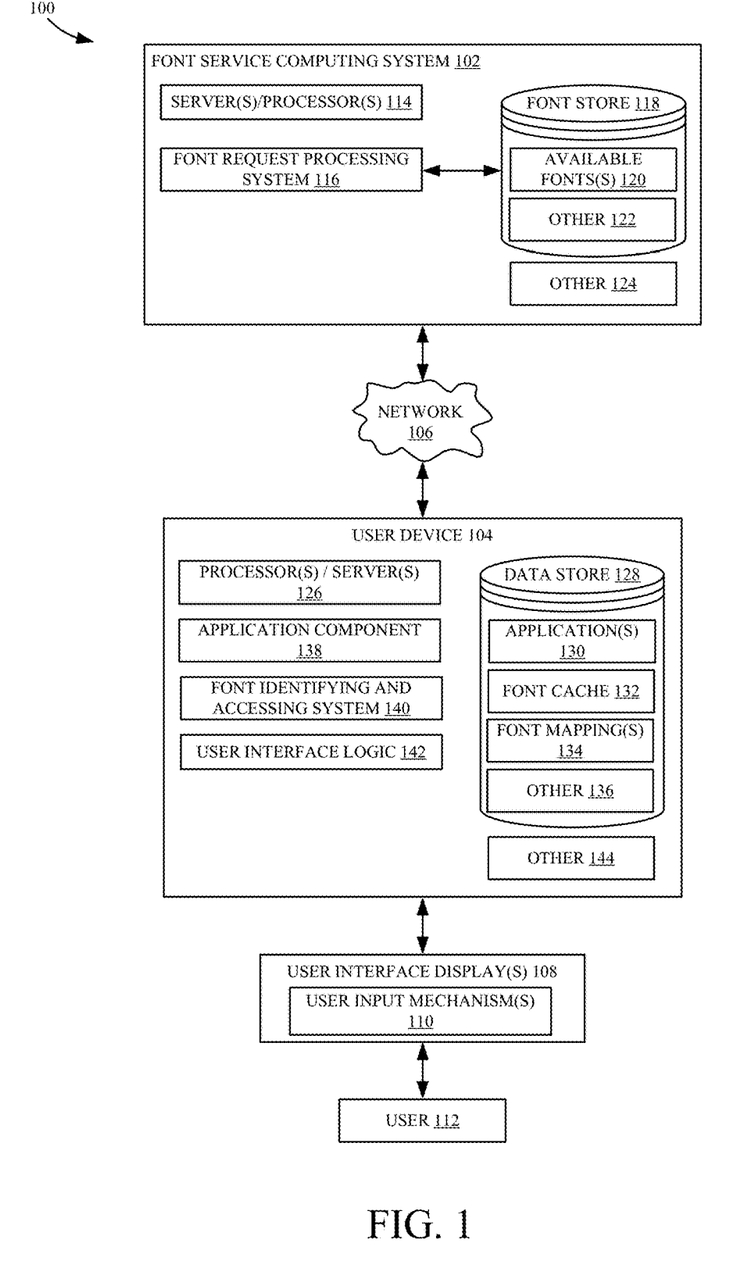
FIG. 1 is a block diagram of one example of a computing system architecture.

FIG. 1 is a block diagram of one example of a computing system architecture 100. Architecture 100 includes font service 102, and user device 104. Service 102 and device 104 are connectable to one another over network 106. Network 106 can be any of a wide variety of different types of networks, such as a wide area network, a local area network, a near field communication network, among others.

User device 104 illustratively runs an application that generates user interface display 108, with user input mechanisms 110, for interaction by user 112. User 112 illustratively interacts with user input mechanisms 110 in order to control and manipulate user device 104.

Font service computing system 102 illustratively receives requests for various fonts from user devices (or other computing systems) and provides the fonts to those requesting devices or systems. Thus, font service computing system 102 illustratively includes one or more servers or processors 114, font request processing system 116, font store 118 (that stores available fonts 120, and can store other items 122), and it can include a wide variety of other functionality or items 124 as well. Font request processing system 116 illustratively receives font requests and, in response, retrieves the requested font from available fonts 120 in font store 118 and downloads it to the requesting device or system. In another example, it can make the requested font available for retrieval by the requesting device or system, instead of actively downloading it.

In the example shown in FIG. 1, user device 104 includes one or more processors or servers 126, data store 128 (which, itself, stores applications 130, font cache 132, font mappings 134, and it can include other items 136), application component 138, font identifying and accessing system 140, and user interface logic 142. It can include other items 144 as well.

Before describing the operation of architecture 100 in detail, a brief overview of some of the items in architecture 100, and their operation, will first be provided. Application component 138 illustratively runs one or more applications 130. When application component 138 boots (or launches) an application 130, it loads it into active memory and configures it to be run and then begins executing or running the application. The boot process may include a wide variety of steps, such as decompressing the application, etc. When the component 138 boots an application, it provides an indication of this to font identifying and accessing system 140. Font accessing system 140 then begins an asynchronous process, that is asynchronous with the other parts of the application boot process.

Font identifying and accessing system 140 first identifies one or more fonts that will be needed by the application that is currently being booted and then determines whether they are locally available in font cache 132. If not, it requests those fonts from font service computing system 102, and downloads them, while the application is being booted, so that they are available to user 112 when user 112 begins using the application. It should be noted that because system 140 operates asynchronously, the boot process does not need to wait for it. This reduces boot latency.

When font identifying and accessing system 140 is identifying the fonts that will be used by the application that is currently being booted, it first identifies a linguistic characteristic corresponding to user device 104. For instance, it may query a user setting that sets the language for device 104. It may query a locale that is indicative of the location where device 104 is used. It may query installed keyboards to identify the language of those keyboards, or it may do a wide variety of other things. It then accesses font mappings 134 that map between linguistic characteristics and font identifiers that identify the fonts that will likely be used by the application being booted.

Figure 2:
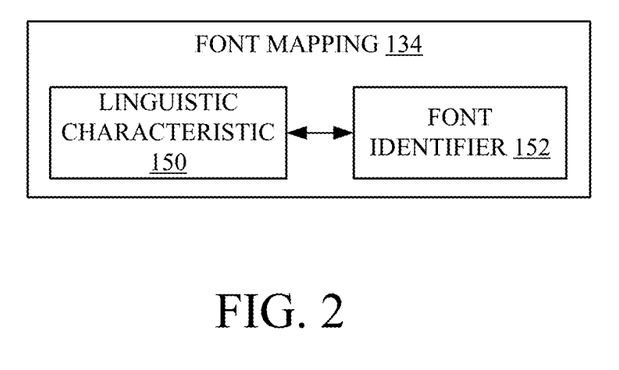
FIG. 2 is a block diagram of one example of a font mapping.

FIG. 2 is a block diagram of one example of a font mapping 134. It can be seen in FIG. 2 that mapping 134 maps from a linguistic characteristic 150 to a font identifier 152. Font identifier 152 identifies one or more fonts that will likely be needed for the application being booted, based upon the linguistic characteristic 150 corresponding to user device 104.

User interface logic 142 illustratively generates (either on its own or under the control of another item in user device 104) user interface displays 108. It also illustratively detects user inputs through user input mechanisms 110 or other user input mechanisms (such as keypads, keyboards, point and click devices, etc.).

Figure 3:
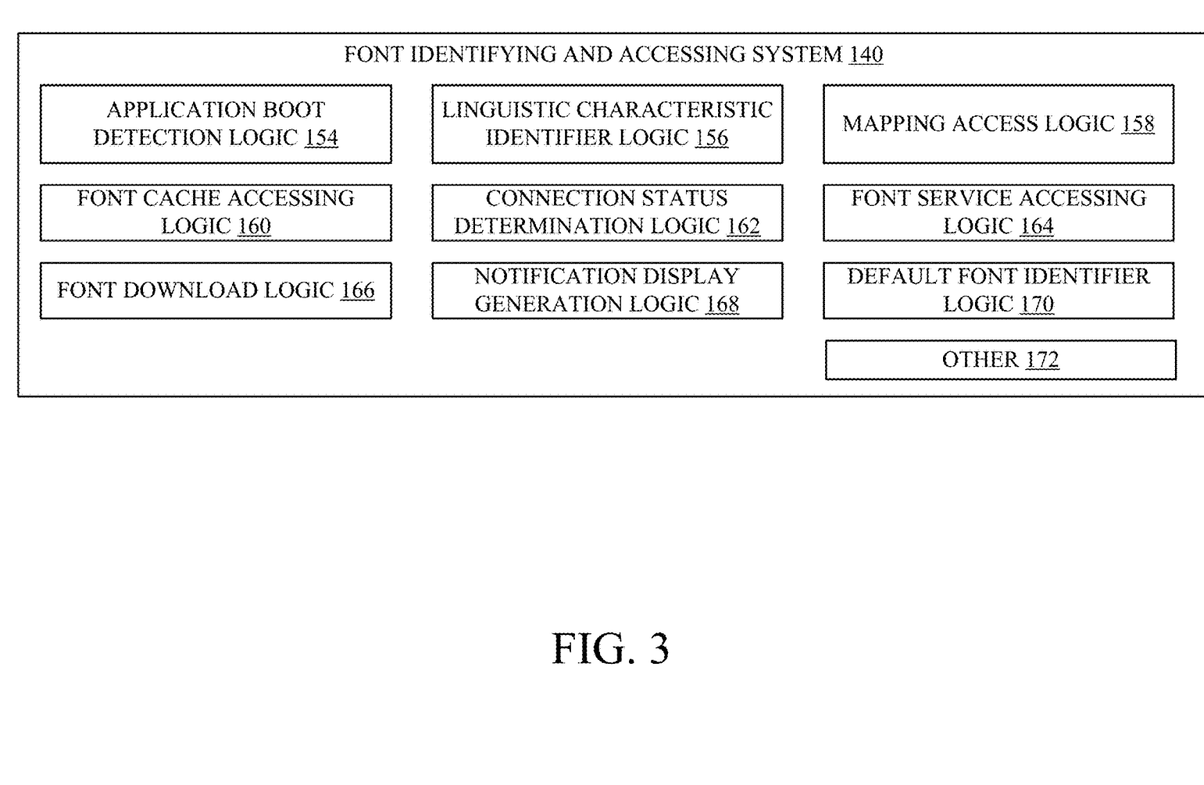
FIG. 3 is a block diagram of one example of a font identifying and accessing system.

Before describing the operation of architecture 100 in more detail, a more detailed description of one example of font identifying and accessing system 140 will first be provided. FIG. 3 is one example of a more detailed block diagram of font identifying and accessing system 140. In the example shown in FIG. 3, system 140 illustratively includes application boot detection logic 154, linguistic characteristic identifier logic 156, mapping access logic 158, font cache accessing logic 160, connection status determination logic 162, font service accessing logic 164, font download logic 166, notification display generation logic 168, default font identifier logic 170, and it can include other items 172.

Application boot detection logic 154 detects when a particular application is being booted. Linguistic characteristic identifier logic 156 can query various portions of user device 104 to identify the linguistic characteristic that will be used to determine which fonts are needed. Mapping access logic 158 accesses the font mappings 134, based upon the identified linguistic characteristic and font cache accessing logic 160 determines whether the identified font is already locally available in font cache 132. Connection status determination logic 162 determines whether user device 104 has access to a network connection, so that it can download a font from font service computing system 102. Font service accessing logic 164 accesses font service computing system 102 to obtain a desired font, and font download logic 166 downloads that font. Notification display generation logic 168 illustratively generates a user notification in the event that user device 104 cannot access font service computing system 102, and default font identifier logic 170 can identify a default font that can be used to render content, when the identified font is not locally available and when device 104 does not have network access (or other access to font service computing system 102).

Figure 4A:
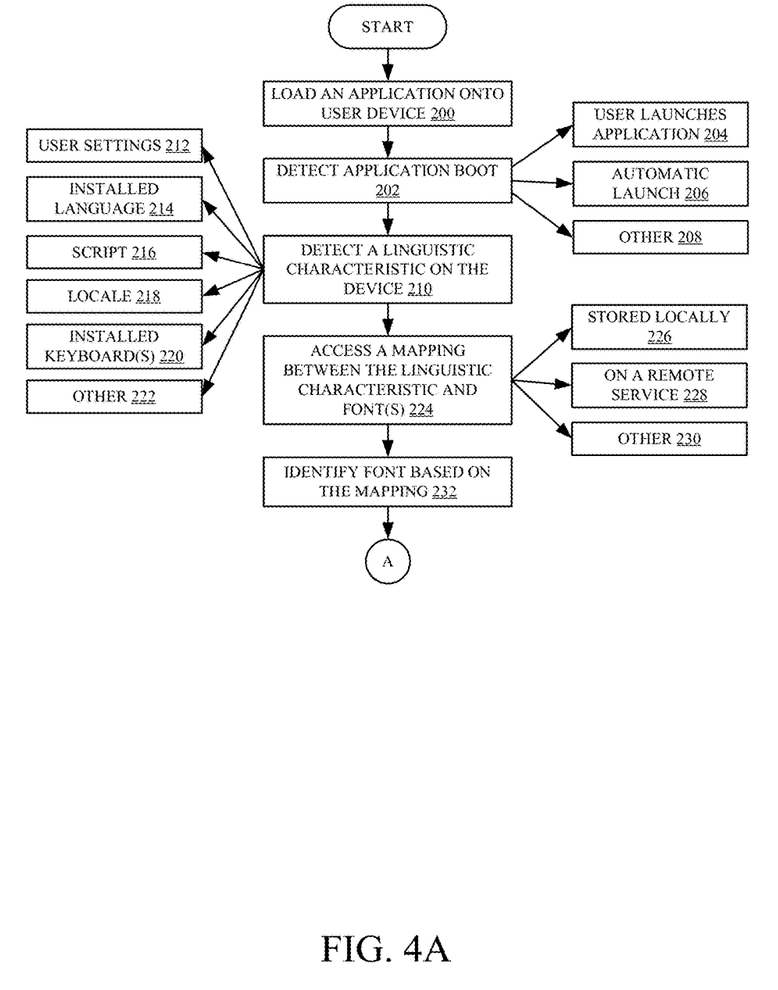
FIGS. 4A and 4B (collectively referred to herein as FIG. 4) show a flow diagram illustrating one example of the operation of the architecture illustrated in FIG. 1, and the font identifying and accessing system illustrated in FIG. 3, in identifying and accessing a font in response to detecting an application boot.
Figure 4B:
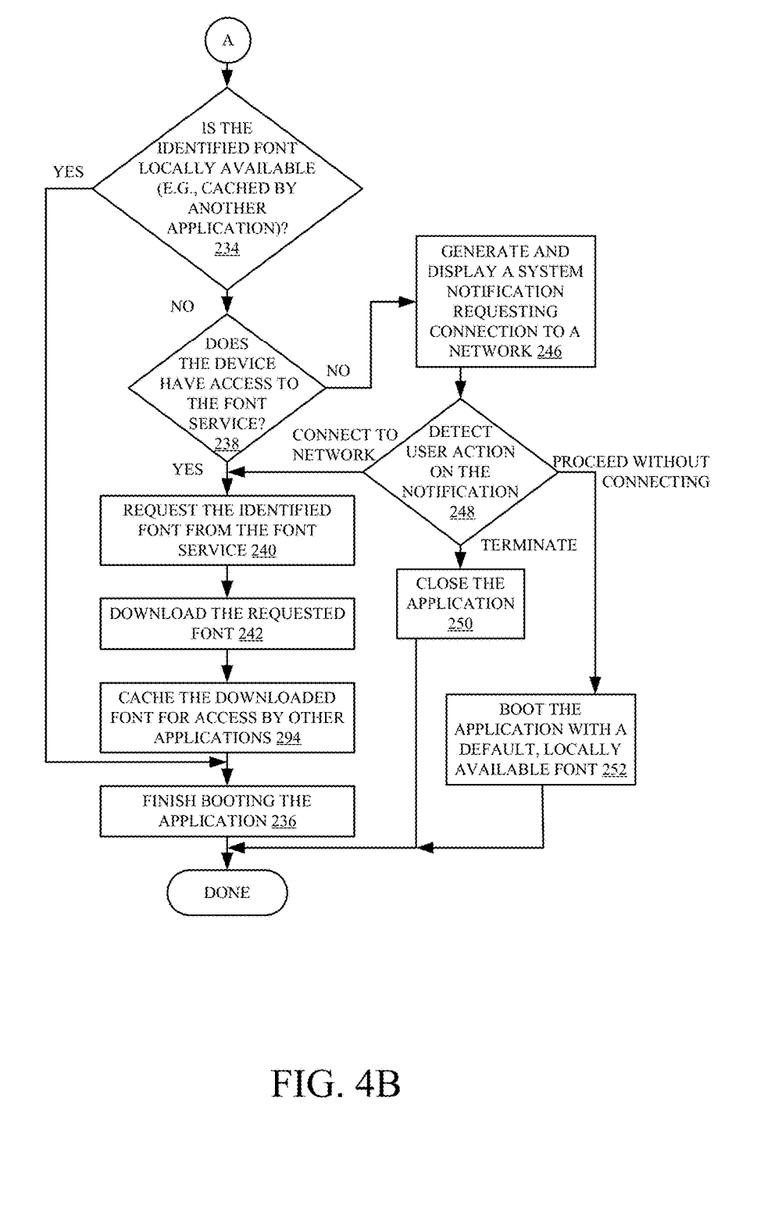

FIGS. 4A and 4B (collectively referred to herein as FIG. 4) show a flow diagram illustrating the operation of architecture 100, and font identifying and accessing system 140, in identifying a font that will be needed by an application that is being booted, and in accessing that font while the application is being booted. It will first be noted that the operation of font identifying and accessing system 140 may be an asynchronous process. That is, it can take place while application component 138 is continuing to boot the application.

With reference to FIG. 4, it is first noted that, at some point, the application that is to be booted will be installed on or otherwise loaded onto user device 104. This is indicated by block 200 in FIG. 4. For instance, user 112 may navigate to a cloud-based application store (or another application store) and download the application on device 104. The application may be initially installed on device 104, or it may be loaded onto device 104 in other ways.

At some point, application boot detection logic 154 detects that the application is being booted. This is indicated by block 202. In one example, the user launches the application through a user input mechanism 110. This is indicated by block 204. In another example, the application can be automatically launched as indicated by block 206. It can be launched in other ways as well, and this is indicated by block 208.

Once the application boot has been detected, and while it is commencing, linguistic characteristic identifier logic 156 detects a linguistic characteristic corresponding to user device 104. This is indicated by block 210 in FIG. 4. By way of example, it may be that user 112 has set a user setting on device 104 that identifies a particular language that the user wishes to use on device 104. Linguistic characteristic identifier logic 156 can query that user setting. This is indicated by block 212.

Linguistic characteristic identifier logic 156 may also query the installed language identifier that identifies the particular language that will be used by device 104, for instance, upon power up. Querying the installed language identifier is indicated by block 214 in FIG. 4.

Logic 156 may also query for a particular script that is associated with device 104, or with the application being booted. This is indicated by block 216 in FIG. 4.

Logic 156 may also query a locale identifier that identifies a particular locale that user device 104 is being used in. This is indicated by block 218. For instance, user device 104 may have a location identifying system (such as a GPS receiver or other system) that identifies a current location of device 104. Logic 156 can query this device to obtain the locale of device 104. It will be noted that the locale of device 104 may be identified in other ways as well.

Linguistic characteristic identifier logic 156 can also query device 104 to determine which keyboards device 104 has installed. By knowing which keyboards are installed, logic 156 can identify the actual glyphs that the user will be inputting. It will be noted that this may be different than the installed language 214 or the user setting 212. For instance, in India, it may be that a user uses English as the installed language on the device, or as the language identified by the user setting 212, but actually inputs information in the Hindi language, through a Hindi-based keyboard. This is just one example. Identifying the installed keyboards is indicated by block 220 in the flow diagram of FIG. 4.

Linguistic characteristic identifier logic 156 can identify the linguistic characteristic corresponding to device 104 in other ways as well. This is indicated by block 222 in the flow diagram of FIG. 4.

Once the linguistic characteristic has been identified, mapping access logic 158 accesses font mappings 134 to identify a matching font mapping. This is indicated by block 224 in the flow diagram of FIG. 4. It will be noted that, in the example shown in FIG. 1, font mappings 134 are stored locally on user device 104. This is indicated by block 226. They can, however, be stored on a remote service as indicated by block 228. The mappings can be accessed in other ways as well, and this is indicated by block 230.

Once mapping access logic 158 has identified a matching mapping, based upon the identified linguistic characteristic, it then follows that mapping to identify a font that is mapped to that characteristic. This is indicated by block 232.

Font cache accessing logic 160 then accesses font cache 132 to determine whether the identified font is locally available. This is indicated by block 234. It may be, for instance, that an application that was previously booted has already downloaded the identified font from font service computing system 102. It may also be that the identified font was already loaded onto device 104 in some other way. Regardless, if the font is locally available as determined at block 234, then application component 138 finishes booting the application. This is indicated by block 236.

However, if, at block 234, font cache accessing logic 160 determines that the identified font is not locally available in font cache 132, the connection status determination logic 162 determines whether user device 104 has access to the font service computing system 102. For instance, it can determine whether device 104 has access to a network 106 over which it can access service 102. This determination is indicated by block 238 in the flow diagram of FIG. 4.

If so, then font service accessing logic 164 submits a request to font request processing system 116 in font service computing system 102 for the identified font. This is indicated by block 240 in the flow diagram of FIG. 4. Font download logic 166 then downloads the requested font from font service computing system 102, and caches the downloaded font for access by other applications in font cache 132. Downloading and caching the requested font is indicated by blocks 242 and 244, respectively, in the flow diagram of FIG. 4.

Returning to block 238, if connection status determination logic 162 determines that device 104 does not have access to font service computing system 102, then notification display generation logic 168 generates and displays a system notification requesting the user to connect device 104 to a network. This is indicated by block 246 in the flow diagram of FIG. 4. The user can then take a variety of different actions. For instance, the user can take an action to connect device 104 to a network. The user can also terminate the application boot or elect to proceed without connecting to a network. Making a determination as to the user action is indicated by block 248 in the flow diagram of FIG. 4.

If the user connects the device 104 to a network, then processing continues at block 240 where the identified font is requested and downloaded from system 102.

If it is detected that the user wishes to terminate the application boot, then application component 138 closes the application. This is indicated by block 250 in the flow diagram of FIG. 4.

If it is determined that the user has provided an input indicating that the user wishes to proceed without connecting to a network, then application component 138 continues to boot the application with a default, locally available font. This is indicated by block 252.

The present system greatly enhances operation of the computing system (or user device). The user device need not have any type of font package preinstalled or preloaded onto it when it loads an application. This frees up a great deal of memory on device 104. However, as soon as an application boot is detected, the font that will likely be used by that application is identified and is downloaded from font service computing system 102. This is in contrast to some current systems that wait until a user actually starts using the application before downloading a desired font. For instance, if the application is a word processing application, the present system immediately identifies the fonts that will likely be used by that application when it detects that the application is being booted. Thus, the desired fonts will likely be downloaded and available to the user even before the user opens a document or begins authoring a document or otherwise begins using the word processing application. Thus, the present system is substantially transparent to the user, but greatly enhances the operation of the user device, because it frees up a great deal of memory that would otherwise be consumed by a font package that accompanies an application.

This also contradicts some current conventional methods. For instance, some systems are currently developed under the assumption that it is almost always best to have all fonts immediately available on a device. The present system, however, operates in a way that is substantially the opposite. The present system operates substantially without loading any fonts onto a device, when a user loads an application. The likely fonts that will be used by the application, on that particular device, are then identified when the application is actually booted. The identified fonts are then downloaded and are available to the user before the user begins using the application.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
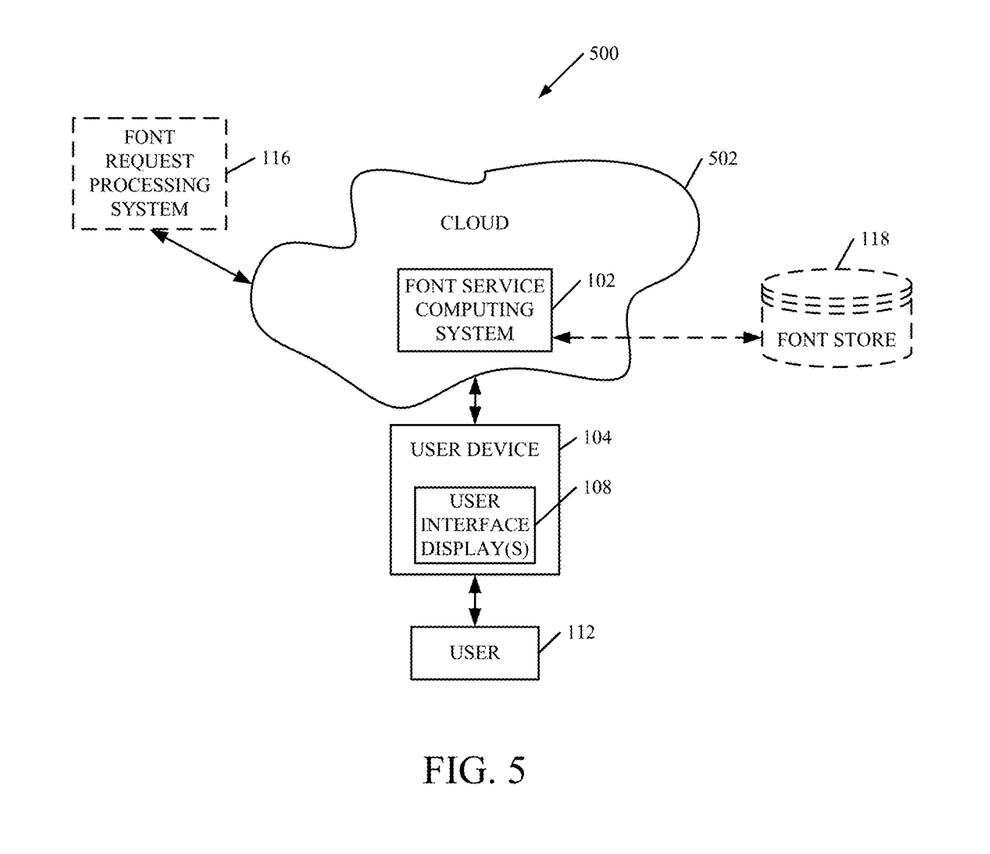
FIG. 5 is a block diagram illustrating one example of the architecture shown in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that font service computing system 102 can be located in cloud 502 (which can be public, private, or a combination where portions are public while others are private). Therefore, user 112 uses a user device 104 to access those systems through cloud 502.

FIG. 5 also depicts another example of a cloud architecture. FIG. 5 shows that it is also contemplated that some elements of architecture 100 can be disposed in cloud 502 while others are not. By way of example, data store 118 can be disposed outside of cloud 502, and accessed through cloud 502. In another example, front request process system 116 can be outside of cloud 502. Regardless of where they are located, they can be accessed directly by device 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
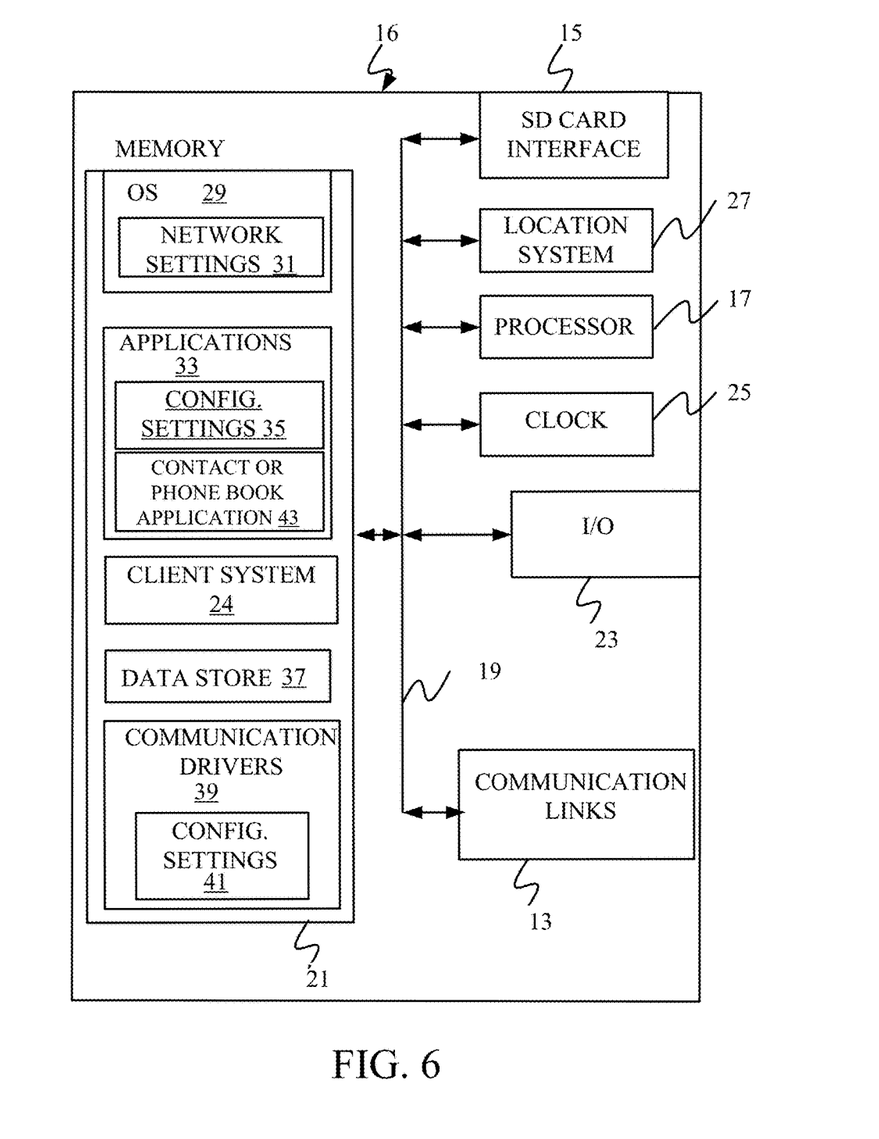
FIGS. 6-8 show various examples of mobile devices that can be used in the architectures shown in the previous figures.
Figure 7:
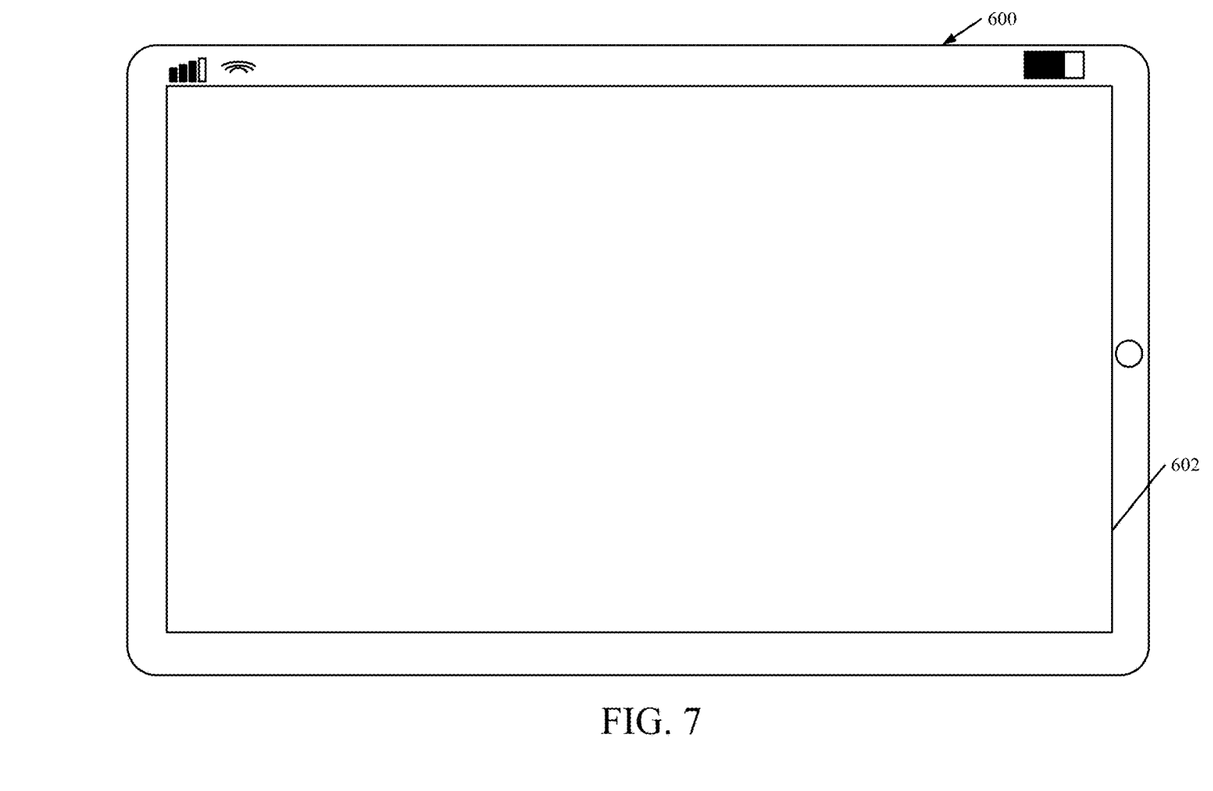
Figure 8:
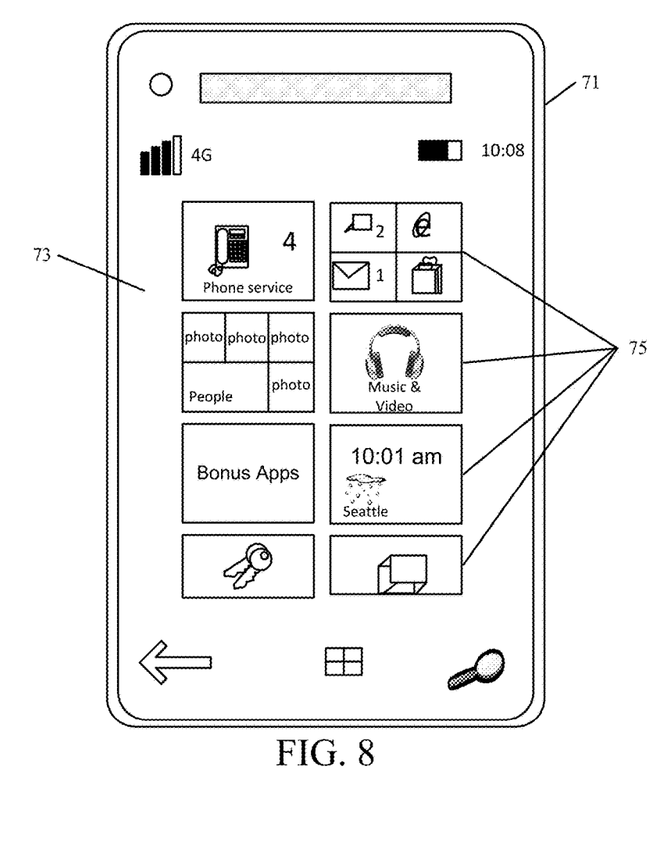
Figure 9:
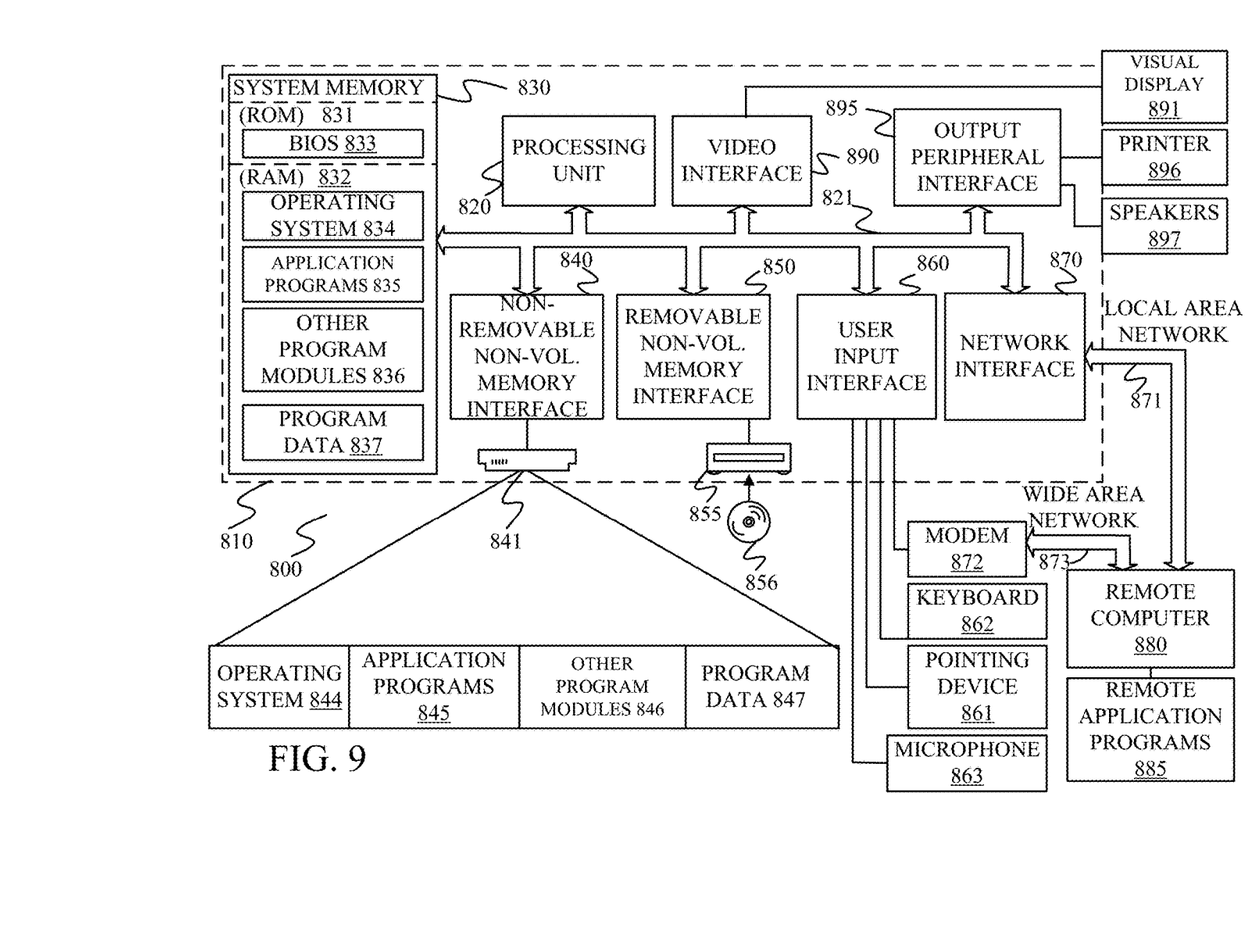
FIG. 9 is a block diagram of one example of a computing environment that can be used in the architectures shown in the previous figures.

FIG. 6 is a simplified block diagram of one illustrative embodiment of a handheld or mobile computing device that can be used as a user's or client's hand held device 16, in which the present system (or parts of it) can be deployed. FIGS. 7-9 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody servers or processors from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise sensors or processors from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
application boot detection logic that detects initiation of a boot process to boot an application on a device;
linguistic characteristic identifier logic that, in response to the application boot detection logic detecting initiation of the boot process to boot the application, identifies a linguistic characteristic corresponding to the device; and
font service accessing logic that generates a call to a remote font service, that is remote relative to the device, to obtain a font identified based on the linguistic characteristic, the font service accessing logic making the call asynchronously relative to the boot process.

Example 2 is the computing system of any or all previous examples and further comprising:
mapping access logic that accesses a mapping that maps from the identified linguistic characteristic to a font identifier that identifies the font.

Example 3 is the computing system of any or all previous examples wherein the linguistic characteristic identifier is configured to identify the linguistic characteristic based on a language user setting that identifies a language.

Example 4 is the computing system of any or all previous examples wherein the linguistic characteristic identifier is configured to identify the linguistic characteristic based on an installed language identifier indicative of an installed language on the device.

Example 5 is the computing system of any or all previous examples wherein the linguistic characteristic identifier is configured to identify any keyboard installed on the device and identify the linguistic characteristic based on the installed keyboard.

Example 6 is the computing system of any or all previous examples wherein the linguistic characteristic identifier is configured to identify a locale corresponding to the device and identify the linguistic characteristic based on the locale.

Example 7 is the computing system of any or all previous examples and further comprising:
a local font cache that is local to the device; and
font cache accessing logic that accesses the local font cache to determine whether the font is stored in the local font cache.

Example 8 is the computing system of any or all previous examples and further comprising:
font download logic that, if the font is not in the local font cache, downloads the font from the remote font service asynchronously relative to the boot process, and saves the font to the local font cache.

Example 9 is the computing system of any or all previous examples and further comprising:
connection status determination logic that, in response to the font cache accessing logic determining that the font is not in the local font cache, determines whether the device is connected to a network so it can access the remote font service.

Example 10 is the computing system of any or all previous examples and further comprising:
notification display generation logic that generates a user notification, in response to the connection status determination logic determining that the device is not connected to the network, requesting a user to connect the device to the network.

Example 11 is a computer implemented method, comprising:
detecting initiation of a boot process to boot an application on a device;

in response to detecting initiation of the boot process to boot the application, identifying a linguistic characteristic corresponding to the device;

identifying a font based on the linguistic characteristic; and generating a call to a remote font service, that is remote relative to the device, to obtain the identified font, the call being generated asynchronously relative to the boot process.

Example 12 is the computer implemented method of any or all previous examples wherein identifying the font comprises:

accessing a mapping that maps from the identified linguistic characteristic to a font identifier that identifies the font.

Example 13 is the computer implemented method of any or all previous examples wherein identifying the linguistic characteristic comprises:

detecting a language user setting that identifies a language; and identifying the linguistic characteristic based on the language user setting.

Example 14 is the computer implemented method of any or all previous examples wherein identifying the linguistic characteristic comprises:

detecting an installed language identifier indicative of an installed language on the device; and identifying the linguistic characteristic based on an installed language identifier.

Example 15 is the computer implemented method of any or all previous examples wherein identifying the linguistic characteristic identifier comprises:

detecting a keyboard installed on the device; and identifying the linguistic characteristic based on the installed keyboard.

Example 16 is the computer implemented method of any or all previous examples wherein identifying the linguistic characteristic comprises:

identifying a locale corresponding to the device; and identifying the linguistic characteristic based on the locale.

Example 17 is the computer implemented method of any or all previous examples and further comprising:

accessing a local font cache to determine whether the font is stored in the local font cache;

if the font is not in the local font cache, downloading the font from the remote font service asynchronously relative to the boot process; and saving the font to the local font cache.

Example 18 is the computer implemented method of any or all previous examples and further comprising:

in response to determining that the font is not in the local font cache, determining whether the device is connected to a network so it can access the remote font service; and in response to the connection status determination logic determining that the device is not connected to the network, generating a user notification, requesting a user to connect the device to the network.

Example 19 is a computing system, comprising:

application boot detection logic that detects initiation of a boot process to boot an application on a device;

linguistic characteristic identifier logic that, in response to the application boot detection logic detecting initiation of the boot process to boot the application, identifies a linguistic characteristic corresponding to the device;

mapping access logic that accesses a mapping that maps from the identified linguistic characteristic to a font identifier that identifies a font; and font service accessing logic that generates a call to a remote font service, that is remote relative to the device, to obtain the font, the font service accessing logic making the call asynchronously relative to the boot process.

Example 20 is the computing system of any or all previous examples and further comprising:

a local font cache that is local to the device;

font cache accessing logic that accesses the local font cache to determine whether the font is stored in the local font cache; and font download logic that, if the font is not in the local font cache, downloads the font from the remote font service asynchronously relative to the boot process, and saves the font to the local font cache.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor:
   memory, including active memory, coupled to the at least one processor and storing instructions that, when executed by the at least one processor, provide application launch logic, application launch detection logic, linguistic characteristic identifier logic, and font service accessing logic;
   the application launch logic being configured to load an application into the active memory and configure the application to be executed;
   the application launch detection logic being configured to detect initiation of the application on the computing system by the application launch logic;
   the linguistic characteristic identifier logic being configured to identify, in response to the application launch detection logic detecting initiation of the application, a linguistic characteristic corresponding to the computing system;
   the font service accessing logic being configured to generate a call to a remote font service, that is remote relative to the computing system, to obtain a font identified based on the linguistic characteristic, the font service accessing logic making the call asynchronously relative to the initiation of the application and during initiation of the application
   a local font cache that is local to the computing system;
   font cache accessing logic that accesses the local font cache to determine whether the font is stored in the local font cache;
   font download logic that, if the font is not in the local font cache, downloads the font from the remote font service asynchronously relative to the initiation of the application, and saves the font to the local font cache; and
   connection status determination logic that, in response to the font cache accessing logic determining that the font is not in the local font cache, determines whether the computing system is connected to a network so it can access the remote font service.

2. The computing system of claim 1 and further comprising:
   mapping access logic that accesses a mapping that maps from the identified linguistic characteristic to a font identifier that identifies the font.

3. The computing system of claim 1 wherein the linguistic characteristic identifier is configured to identify the linguistic characteristic based on a language user setting that identifies a language.

4. The computing system of claim 1 wherein the linguistic characteristic identifier is configured to identify the linguistic characteristic based on an installed language identifier indicative of an installed language on the computing system.

5. The computing system of claim 1 wherein the linguistic characteristic identifier is configured to identify any keyboard installed on the computing system and identify the linguistic characteristic based on the installed keyboard.

6. The computing system of claim 1 wherein the linguistic characteristic identifier is configured to identify a locale corresponding to the computing system and identify the linguistic characteristic based on the locale.

7. The computing system of claim 1 and further comprising:
notification display generation logic that generates a user notification, in response to the connection status determination logic determining that the computing system is not connected to the network, requesting a user to connect the computing system to the network.

8. A computer implemented method, comprising:
detecting initiation of an application on the computer;
in response to detecting initiation of the application, identifying a linguistic characteristic corresponding to the computer;
identifying a font based on the linguistic characteristic asynchronously during initiation of the application;
generating a call to a remote font service, that is remote relative to the computer, to obtain the identified font, the call being generated asynchronously relative to initiation of the application and occurring during initiation of the application;
accessing a local font cache to determine whether the font is stored in the local font cache;
if the font is not in the local font cache, downloading the font from the remote font service asynchronously relative to the initiation of the application;
saving the font to the local font cache;
in response to determining that the font is not in the local font cache, determining, with connection status determination logic, whether the computer is connected to a network so the computer can access the remote font service; and
in response to the connection status determination logic determining that the computer is not connected to network, generating a user notification, requesting a user to connect the computer to the network.

9. The computer implemented method of claim 8 wherein identifying the font comprises:
accessing a mapping that maps from the identified linguistic characteristic to a font identifier that identifies the font.

10. The computer implemented method of claim 8 wherein identifying the linguistic characteristic comprises:
detecting a language user setting that identifies a language; and
identifying the linguistic characteristic based on the language user setting.

11. The computer implemented method of claim 8 wherein identifying the linguistic characteristic comprises:
detecting an installed language identifier indicative of an installed language on the computer; and
identifying the linguistic characteristic based on an installed language identifier.

12. The computer implemented method of claim 8 wherein identifying the linguistic characteristic comprises:
detecting a keyboard installed on the computer; and
identifying the linguistic characteristic based on the installed keyboard.

13. The computer implemented method of claim 8 wherein identifying the linguistic characteristic comprises:
identifying a locale corresponding to the computer; and
identifying the linguistic characteristic based on the locale.

14. A computing system, comprising:
at least one processor;
memory coupled to the at least one processor and storing instruction that, when executed by the at least one processor, provide application launch detection logic, linguistic characteristic identifier logic, mapping access logic, and font service accessing logic;
the application launch detection logic being configured to detect initiation of an application on the computing system;
the linguistic characteristic identifier logic being configured to identify, in response to the application launch detection logic detecting initiation of the application, a linguistic characteristic corresponding to the computing system;
the mapping access logic being configured to access a mapping that maps from the identified linguistic characteristic to a font identifier that identifies a font;
the font service accessing logic being configured to generate a call to a remote font service during initiation of the application, that is remote relative to the computing system, to obtain the font, the font service accessing logic making the call asynchronously relative to the initiation of the application;
a local font cache that is local to the computing system;
font cache accessing logic that is configured to access the local font cache to determine whether the font is stored in the local font cache;
font download logic that, if the font is not in the local font cache, is configured to download the font from the remote font service asynchronously relative to the initiation of the application, and save the font to the local font cache; and
connection status determination logic that, in response to the font cache accessing logic determining that the font is not in the local font cache, is configured to determine whether the computing system is connected to a network so it can access the remote font service.

* * * * *